(12) United States Patent
Lau et al.

(10) Patent No.: US 9,039,810 B2
(45) Date of Patent: May 26, 2015

(54) FINES CAPTURE AND RECYCLE SYSTEM AND USES THEREOF

(75) Inventors: Francis Lau, Darien, IL (US);
Tsung-Yao Robert Sheng, Hinsdale, IL (US)

(73) Assignee: Synthesis Energy Systems, Inc., Houston, TX (US)

( * ) Notice: Subject to any disclaimer, the term of this patent is extended or adjusted under 35 U.S.C. 154(b) by 452 days.

(21) Appl. No.: 13/532,769

(22) Filed: Jun. 25, 2012

(65) Prior Publication Data

US 2013/0181170 A1    Jul. 18, 2013

Related U.S. Application Data

(60) Provisional application No. 61/500,630, filed on Jun. 24, 2011.

(51) Int. Cl.
*B01D 45/00* (2006.01)
*C10J 3/84* (2006.01)
*C01B 3/02* (2006.01)
*C10J 3/56* (2006.01)

(52) U.S. Cl.
CPC ... *C10J 3/84* (2013.01); *C01B 3/02* (2013.01); *C10J 3/56* (2013.01); *C10J 2300/093* (2013.01); *C10J 2300/0976* (2013.01)

(58) Field of Classification Search
CPC .......... C10J 3/84; C10J 3/56; C10J 2300/093; C10J 2300/0976; C01B 3/02
USPC ................ 55/458, 459.1, 424, 426, 345, 466; 95/269, 271; 422/139, 187, 147, 311; 201/13, 31; 208/113
See application file for complete search history.

(56) References Cited

U.S. PATENT DOCUMENTS 5,266,187 A * 11/1993 Horecky et al. ............... 208/161
2012/0138861 A1* 6/2012 Liu ................................ 252/373
2012/0167463 A1* 7/2012 Abughazaleh .................... 48/89

* cited by examiner

*Primary Examiner* — Dung H Bui
(74) *Attorney, Agent, or Firm* — Kening Li; Miller Canfield

(57) ABSTRACT

A cyclone system for a gasifier having two or more cyclones arranged in series sharing a combined loop seal and dipleg is disclosed. Also disclosed is a method for capturing and recycling fines with the cyclone system.

16 Claims, 1 Drawing Sheet

Overall Arrangement of Gasifier, Cyclones and Diplegs

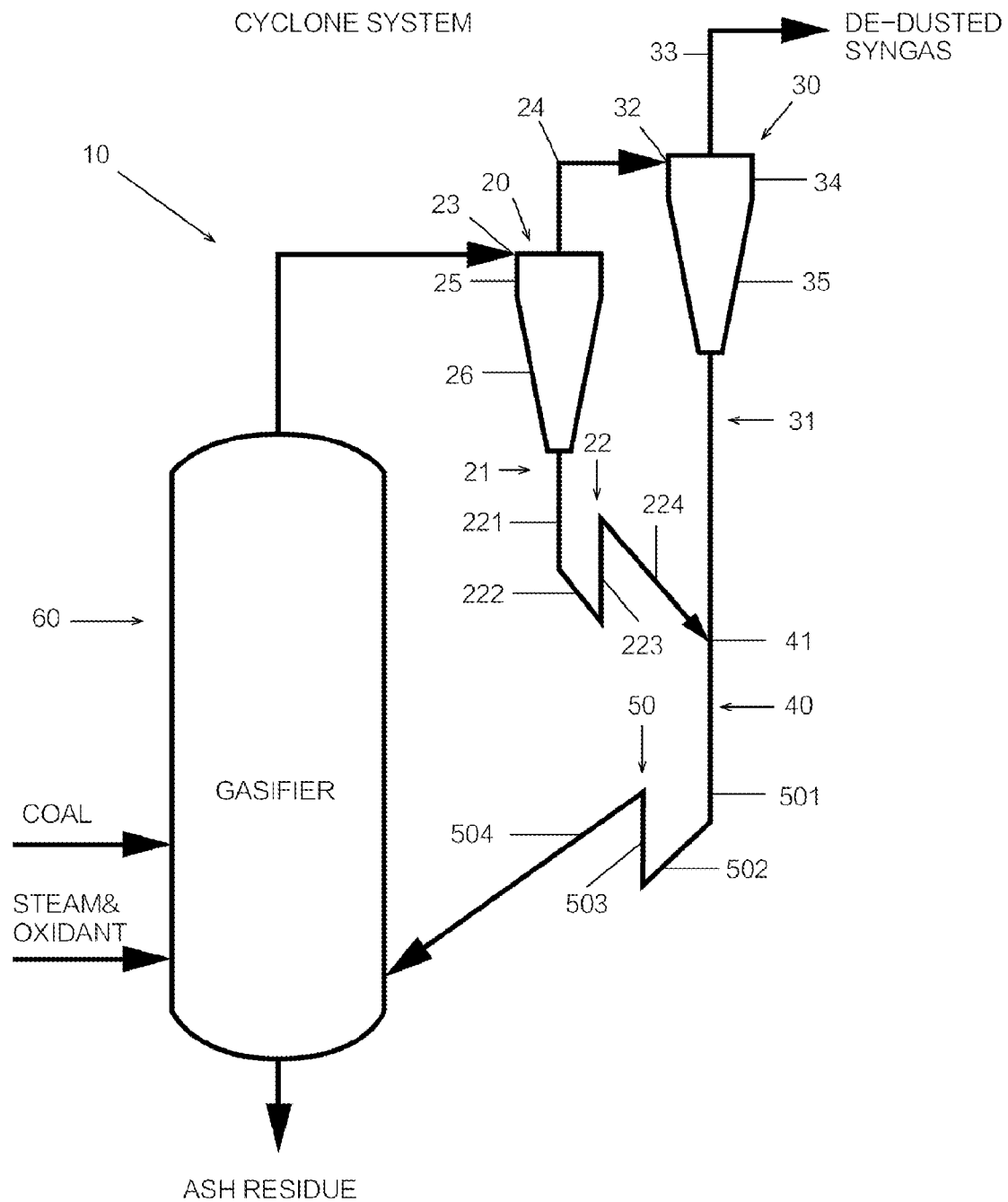
Overall Arrangement of Gasifier, Cyclones and Diplegs

FINES CAPTURE AND RECYCLE SYSTEM AND USES THEREOF

FIELD OF THE INVENTION

The present invention relates to coal gasification using fluidized bed reactor. More specifically, the invention relates to a method and apparatus of capturing solids from syngas stream emanating from fluidized bed reactor and then returning the solids to the fluidized bed reactor.

BACKGROUND OF THE INVENTION

Coal gasification is the process to convert coal into syngas primarily containing carbon monoxide (CO) and hydrogen ($H_2$). The major types of gasifier are: moving bed gasifier, entrained flow gasifier, and fluidized bed gasifier. The crude syngas leaving the gasifier contains carbon monoxide, hydrogen, water vapor, solids, and hydrocarbons in varying amounts depending on the feedstock material, and type and operating conditions of the gasifier.

In a fluidized bed gasifier, the bed contains a certain amount of small solid particles or "fines", the amount of which depends primarily on the amount of fines contained in feedstock material and the operating conditions of the gasifier such as the temperature, pressure, velocity and gas/solids contact, etc. A certain portion of the fines is inevitably entrained or carried out by the crude syngas leaving the gasifier. These fines contain unconverted carbon and therefore are a "loss" to the gasifier.

Most fluidized bed gasifiers operate at temperatures somewhat below the ash fusion temperatures to avoid clinker formation in the gasifier which will defluidize the beds and result in involuntary shutdown. The relatively low operating temperatures, and consequently, the non-slagging mode of operation of fluidized bed gasifiers eliminate many design and operating problems commonly associated with slagging entrained flow gasifiers resulting from molten ash at high operating temperatures. The low operating temperatures, however, also limit the carbon conversion of fluidized bed gasifiers. To increase the carbon conversion of fluidized bed gasifiers, the amount of fines loss from the gasifiers must be kept as low as possible, so the fines entrained by the crude syngas must be captured and returned to the gasifiers for more gasification reactions.

Increasing gas and solids residence time in fluidized bed gasifier and/or decreasing the superficial velocity of crude syngas leaving the gasifier will decrease the amount of fines carried over by the crude syngas. However these methods will also significantly increase the costs of the gasifier. A more feasible method to increase the overall carbon conversion of fluidized bed gasifier is to capture and recycle the carried-over fines to the gasifier.

Cyclone systems have been commercially used to capture solids particles entrained by effluent gas from fluidized bed reactors and then return the captured solids to the reactors. However, the solids entrained by the crude syngas from fluidized bed gasifiers often contain very small (e.g. less than 20 μm in diameter) and light solids particles or fines which are difficult to be captured by the conventional cyclones. Furthermore, these fines are often difficult to flow through or discharge from a cyclone dipleg causing frequent solids bridging or plugging problems and ultimately involuntary shutdown of the gasifier and cyclone systems. Different devices and methods using pneumatic and/or mechanical conveyors, valves, eductors, or rotary feeders, for example, have been tried to resolve these problems for fluidized bed reactors operated at high temperatures and pressures. However, the current devices and methods do not work well to provide a reliable long term solution for these problems.

The objective of the present invention therefore resides in providing an apparatus and a method for capturing and recycling small fines for fluidized bed reactors or gasifiers operated at high temperatures and pressures in a more reliable and simpler manner.

SUMMARY OF THE INVENTION

This invention is based, at least in part, upon the unexpected discovery that in a two stage cyclones in series, combining the first stage fines with the second stage fines offers a simple solution without any need of a rotating or moving device to efficiently capture fines carried over by crude syngas leaving a fluidized bed gasifier and recycle the fines to the gasifier.

Accordingly, in one aspect, the invention features a cyclone system for a gasifier having two or more cyclones arranged in series. The cyclone system comprises a first stage cyclone, a first dipleg, a first loopseal, a second stage cyclone, a second dipleg, a combined dipleg, and a combined loopseal. The first stage cyclone has a first inlet and a first outlet. The first inlet is in fluid communication with the gasifier and receives a first gas-solid mixture from the gasifier. The first dipleg is connected to the first stage cyclone for collecting a first solid particle fraction separated from the first gas-solid mixture. The first loopseal is connected to the first dipleg for receiving the first solid particle fraction. The second stage cyclone has a second inlet and a second outlet. The second inlet is in fluid communication with the first outlet and receives a second gas-solid mixture from the first stage cyclone. The second dipleg is connected to the second stage cyclone for collecting a second solid particle fraction separated from the second gas-solid mixture. The combined dipleg is connected to both the first loopseal and the second dipleg. The combined loopseal is connected to the combined dipleg for receiving a mixture of the first and second solid particle fractions, and to the gasifier for feeding the mixture of the first and second solid particle fractions back to the gasifier.

In another aspect, the invention features a gasifier system. The gasifier system comprises a gasifier and a cyclone system of the invention.

The gasifier may be a fluidized bed gasifier. The first inlet may be a half-volute inlet, while the second inlet may be a tangential inlet.

In some embodiments, the first loopseal comprises a first vertical downcomer connected to the first dipleg for receiving the first solid particle fraction, a first downwardly inclined segment downstream of the first vertical downcomer, a first riser downstream of the first downwardly inclined segment, and a second downwardly inclined segment downstream of the first riser. The combined dipleg can be connected at a branch point of the combined dipleg to the second dipleg and the second downwardly inclined segment of the first loopseal.

In some embodiments, the combined loopseal comprises a second vertical downcomer for receiving a mixture of the first and second solid particle fractions, a third downwardly inclined segment downstream of the second vertical downcomer, a second riser downstream of the third downwardly inclined segment, and a fourth downwardly inclined segment downstream of the second riser and connected back to the gasifier.

The invention also features methods for capturing and recycling fines. One of the methods comprises delivering a first gas-solid mixture from a gasifier to a first inlet of a first stage cyclone, separating the first gas-solid mixture into a second gas-solid mixture and a first solid particle fraction in the first stage cyclone, feeding the second gas-solid mixture from a first outlet of the first stage cyclone to a second inlet of a second stage cyclone and collecting the first solid particle fraction sequentially through a first dipleg connected to the first stage cyclone and a first loopseal connected to the first dipleg, separating from the second gas-solid mixture a second solid particle fraction in the second stage cyclone, collecting the second solid particle fraction through a second dipleg connected to the second stage cyclone, collecting a mixture of the first solid particle fraction from the first loopseal and the second solid particle fraction from the second dipleg sequentially through a combined dipleg connected to both the first loopseal and the second dipleg and a combined loopseal connected to both the combined dipleg and the gasifier, and feeding the mixture of the first and second solid particle fractions from the combined loopseal back to the gasifier.

Another method of the invention comprises the steps of generating a first gas-solid mixture in a gasifier, delivering the first gas-solid mixture from the gasifier to a first inlet of a first stage cyclone, separating the first gas-solid mixture into a second gas-solid mixture and a first solid particle fraction in the first stage cyclone, feeding the second gas-solid mixture from a first outlet of the first stage cyclone to a second inlet of a second stage cyclone and collecting the first solid particle fraction sequentially through a first dipleg connected to the first stage cyclone and a first loopseal connected to the first dipleg, separating from the second gas-solid mixture a second solid particle fraction in the second stage cyclone, collecting the second solid particle fraction through a second dipleg connected to the second stage cyclone, collecting a mixture of the first solid particle fraction from the first loopseal and the second solid particle fraction from the second dipleg sequentially through a combined dipleg connected to both the first loopseal and the second dipleg and a combined loopseal connected to both the combined dipleg and the gasifier, and feeding the mixture of the first and second solid particle fractions from the combined loopseal back to the gasifier.

The above-mentioned and other features of this invention and the manner of obtaining and using them will become more apparent, and will be best understood, by reference to the following drawing and description.

BRIEF DESCRIPTION OF THE DRAWING

FIG. 1 shows an exemplary overall arrangement of the gasifier, cyclones, and diplegs according to the present invention.

DETAILED DESCRIPTION OF THE INVENTION

This invention deals with the effective capture and recycle of fines carried over from reactors, such as gasifiers or combustors, and thus improves the collection efficiencies of reactors and improves the overall system performance. In particular, this configuration of cyclones and diplegs enables the recycle of very fine fines back to the reactor. The specific configuration combines the cyclones and diplegs in such manner that the very fine fines from a second stage cyclone can be handled and recycled back to the reactor without the use of mechanical moving devices.

Cyclones and diplegs are commonly used in the prior art, and the combination of two stages of cyclones was also common. However, the present invention is the first to combine the diplegs of the two serially-arranged stages of cyclones to accomplish the surprisingly advantageous effects. These advantageous effects include the prevention of formation of a solid and immobile or slow-moving fines column in the downcomer of the second dipleg, while at the same time preventing gasshort-circuiting (i.e. gas/solids mixture from the first stage cyclone entering the second stage cyclone from the bottom via the first dipleg) which will dramatically decrease the efficiency of the second stage cyclone, or cause it to fail completely. Specifically, through various experimentation, it was determined that the specific configuration (i.e. connecting the downwardly inclined segment 224 of the first dipleg into the downcomer of the second stage dipleg (see below), or "connecting the first into the second") is highly desirable, because other alternatives(e.g. "connecting the second into the first" or "combining the first with the second") do not have the technical advantages of the present invention. This effectively allows the higher volume and higher flow rate gas/solid steam from the first dipleg to push or carry the fines from the second stage cyclone back into the gasifier.

Furthermore, the downwardly inclined segment 224 of the first dipleg is connected to the downcomer of the second stage dipleg at a location in the lean phase region (generally near or at the upper portion of the downcomer). In addition, the diameter and length of the downcomer of the second stage dipleg is selected according to the flow rate and solids content of the gas/solid mixture entering the first inlet 23 of the first cyclone, and the amount of aerating gases throughout the entire system, especially throughout the first dipleg, is determined such that the gas short-circuiting into the second stage cyclone is eliminated or minimized, while no immobile solid column is formed in the second dipleg.

More specifically, referring to FIG. 1, the present invention provides a cyclone system 10 with two or more cyclones arranged in series. The cyclone system 10 has a first stage cyclone 20, a first dipleg 21, a first loopseal 22, a second stage cyclone 30, a second dipleg 31, a combined dipleg 40, and a combined loopseal 50. FIG. 1 shows an exemplary overall arrangement of the gasifier, cyclones, and diplegs.

A first stage cyclone is the first cyclone that receives the output syngas (i.e., a first gas-solid mixture) from a reactor, separates the syngas into a first gas fraction and a first solid particle fraction, and delivers to downstream equipments for further processing.

Referring to FIG. 1, the first stage cyclone 20 has a first inlet 23 for receiving the first gas-solid mixture from the gasifier 60, and a first outlet 24 for delivering the first gas fraction to a second stage cyclone 30. In a preferred configuration, the first inlet 23 is a half-volute inlet. The body of the first stage cyclone 20 includes a first barrel portion 25 and a first cone portion 26. A first dipleg 21 is connected to the first cone portion 26 for collecting the first solid particle fraction. The first solid particle fraction then passes through a first loopseal 22 connected to the first dipleg 21.

Preferably, the first loopseal 22 has a first vertical downcomer 221 connected to the first dipleg 21 for receiving the first solid particle fraction. Subsequently, the first solid particle fraction passes through a first downwardly inclined segment 222, a first riser 223, and a second downwardly inclined segment 224 connected to a combined dipleg 40.

A second stage cyclone is a cyclone that receives the first gas fraction (i.e., a second gas-solid mixture) from the first stage cyclone, further separates the mixture into a second gas fraction and a second solid particle fraction (containing solid particles, e.g., in the range of 50, 40, 30, 20, or 10 microns or less), and delivers to downstream equipments for more processing or discharges the gas and solid particle fractions.

Referring to FIG. 1, similar to the first stage cyclone 20, the second stage cyclone 30 has a second inlet 32 for receiving the second gas-solid mixture from the first stage cyclone 20, and a second outlet 33 for delivering to downstream equipments for further processing or discharges the second gas fraction. In a preferred configuration, the second inlet 32 is a tangential inlet. The body of the second stage cyclone 30 includes a second barrel portion 34 and a second cone portion 35. A second dipleg 31 is connected to the second cone portion 35 for collecting the second solid particle fraction. The second solid particle fraction then passes through to the combined dipleg 40 connected to the second dipleg 31.

Referring to FIG. 1, the combined dipleg 40 is connected (e.g., at a branch point 41 of the combined dipleg 40) to both the first loopseal 22 (e.g., downstream of the second downwardly inclined segment 224) and the second dipleg 31. The mixture of the first and second solid particle fractions then passes through a combined loopseal 50 and returns to the gasifier 60. As shown in FIG. 1, the combined loopseal 50 is connected to the combined dipleg 40 and to the gasifier 60.

Preferably, the combined loopseal 50 has a second vertical downcomer 501 for receiving the mixture of the first and second solid particle fractions, followed by a third downwardly inclined segment 502, a second riser 503, and a fourth downwardly inclined segment 504 connected back to the gasifier 60.

Furthermore, the invention provides a gasifier system including the gasifier 60 and the cyclone system 10 as described above.

The cyclone and gasifier systems of the invention and the like can be used to more readily and efficiently capture and recycle very fine fines.

Accordingly, a method of the invention involves use of a cyclone system of the invention to capture and recycle fines. In this method, a first gas-solid mixture is delivered from the gasifier 60 to the first inlet 23, and separated into a second gas-solid mixture and a first solid particle fraction in the first stage cyclone 20. The second gas-solid mixture passes from the first outlet 24 to the second inlet 32, while the first solid particle fraction is collected through the first dipleg 21 and then the first loopseal 22. A second solid particle fraction is separated from the second gas-solid mixture in the second stage cyclone 30, and collected through the second dipleg 31. Both the first solid particle fraction from the first loopseal 22 and the second solid particle fraction from the second dipleg 31 are then collected through the combined dipleg 40. The mixture of the first and second solid particle fractions passes through the combined loopseal 50 and returns back to the gasifier 60.

Another method of the invention involves use of a gasifier system of the invention to capture and recycle fines. In this method, a first gas-solid mixture (e.g., crude syngas from coal gasification) is generated in the gasifier 60 and delivered from the gasifier 60 to the first stage cyclone 20 via the first inlet 23. The first gas-solid mixture then passes through the cyclone system 10 and is processed as described above.

The solids particles or fines captured by the first and second stage cyclones contain unconverted carbon and must be returned to the gasifier for more gasification reactions to improve the overall carbon conversion of the gasifier. The gasifier is operated at higher pressure than that in the cyclones. Special design and operating features are required to return captured fines from lower pressure to higher pressure. This has always been challenging in fluidized bed reactors especially for fluidized bed gasifiers having a wide particle size distribution of feed materials. The solids particles captured by the first stage cyclone are relatively coarse, heavy and in large mass quantity, and therefore, returning these solids to the gasifier is not as difficult as the second stage fines.

The fines captured by the second stage cyclone are smaller and lighter and in much lower mass quantity than the first stage fines. These fines often exhibit a cohesive behavior and tend to form solids bridges or plugs in the pipes resulting in frequent flowing and discharging problems. A small and long pipe or "dipleg" is required to return the second stage fines to the gasifier to seal against a higher back pressure, which is the differential pressure between the gasifier and second stage cyclone, especially with low solids mass flow rate. This required long and small dipleg further aggravates the flowing and discharge problems of the second stage fines.

Aeration along the dipleg with inert or reacting gases has been used to assist the flowing and discharge of solids particles. It is difficult to aerate or fluidize the second stage fines because the interparticle forces are greater than those resulting from the action of gas. If the dipleg is over aerated or if the aeration gas channeled in the dipleg, the aeration gas will hinder the flowing of solids particles causing blockages and shutdown of the fines recirculation system.

The fines recirculation problems described above have often been the root cause of the failures of many cyclones and diplegs systems for fluidized bed reactors and gasifiers. As mentioned above, the fines recirculation problems will be much more severe for the second stage fines. As mentioned in "BACKGROUND OF THE INVENTION", many methods and devices have tried to mitigate this problem with poor results.

The present invention combines the second stage fines with particles whose diameters are up to two orders of magnitude smaller than those of the first stage fines without using any mechanical or rotating devices, which are commonly used in fluidization industry with poor and unreliable results, to eliminate the problems associated with the second stage fines as mentioned above.

The fines captured in the first stage cyclone are discharged by the first stage dipleg and loopseal to the lean phase of the second stage dipleg. The first stage fines are then mixed with the second stage fines in the combined dipleg. The combined solids mixture flows through the combined dipleg and then re-injected to the gasifier by the combined loopseal. The mass flow rate of the first stage fines are about two orders of magnitude higher than that of the second stage fines. Therefore the combined solids mixture will behave as the coarser and heavier first stage fines. This will completely eliminate the problems associated with the second stage fines due to their cohesive nature, and being difficult to aerate or fluidize in a long and small-diameter dipleg, etc.

Another important feature of the present invention is that the loopseals are equipped with inclined legs comparing to the horizontal legs commonly used in conventional loopseals. The inclined legs will reduce the aeration gas flow rates and facilitate the solids flow. This is more important for the first stage loopseal as the aeration gas fed to the loopseal needs to be minimized so as not to have any adverse impact on the performance of the second stage cyclone.

Aeration gas such as carbon dioxide or steam may be used for the loopseals and diplegs to promote the gasification reactions of the aeration gas and the unconverted carbon in the fines before the fines are returned to the gasifier.

What is claimed is:

1. A cyclone system wherein the cyclone system comprises:
   a first stage cyclone having a first inlet and a first outlet, wherein the first inlet is connected to a fluidized-bed gasifier having two or more cyclone arranged in series, and receives a first gas-solid mixture from the gasifier and receives a first gas-solid mixture from the gasifier; a first dipleg connected to the first stage cyclone for collecting a first solid particle fraction separated from the first gas-solid mixture; a first loopseal connected to the first dipleg for receiving the first solid particle fraction; a second stage cyclone having a second inlet and a second outlet, wherein the second inlet is in fluid communication with the first outlet and receives a second gas-solid mixture from the first stage cyclone; a second dipleg connected to the second stage cyclone for collecting a second solid particle fraction separated from the second gas-solid mixture; a combined dipleg connected to both the first loopseal and the second dipleg; and a combined loopseal connected to the combined dipleg for receiving a mixture of the first and second solid particle fractions, and to the gasifier for feeding the mixture of the first and second solid particle fractions back to the gasifier.

2. The cyclone system of claim 1, wherein the gasifier is a fluidized bed gasifier.

3. The cyclone system of claim 1, wherein the first inlet is a half-volute inlet.

4. The cyclone system of claim 1, wherein the second inlet is a tangential inlet.

5. The cyclone system of claim 1, wherein the first loopseal comprises a first vertical downcomer connected to the first dipleg for receiving the first solid particle fraction, a first downwardly inclined segment downstream of the first vertical. downcomer, a first riser downstream of the first downwardly inclined segment, and a second downwardly inclined segment downstream of the first riser.

6. The cyclone system of claim 5, wherein the combined dipleg is connected at a branch point of the combined dipleg to the second dipleg and the second downwardly inclined segment of the first loopseal.

7. The cyclone system of claim 1, wherein the combined loopseal comprises a second vertical downcomer for receiving a mixture of the first and second solid particle fractions, a third downwardly inclined segment downstream of the second vertical downcomer, a second riser downstream of the third downwardly inclined segment, and a fourth downwardly inclined segment downstream of the second riser and connected back to the gasifier.

8. A method for capturing and recycling fines from a fluidized-bed gasifier, comprising: delivering a first gas-solid mixture from a gasifier to a first inlet of a first stage cyclone; separating the first gas-solid mixture into a second gas-solid mixture and a first solid particle fraction in the first stage cyclone; feeding the second gas-solid mixture from a first outlet of the first stage cyclone to a second inlet of a second stage cyclone and collecting the first solid particle fraction sequentially through a first dipleg connected to the first stage cyclone and a first loopseal connected to the first dipleg; separating from the second gas-solid mixture a second solid particle fraction in the second stage cyclone; collecting the second solid particle fraction through a second dipleg connected to the second stage cyclone; collecting a mixture of the first solid particle fraction from the first loopseal and the second solid particle fraction from the second dipleg sequentially through a combined dipleg connected to both the first loopseal and the second dipleg and a combined loopseal connected to both the combined dipleg and the gasifier; and feeding the mixture of the first and second solid particle fractions from the combined loopseal back to the gasifier.

9. A fluidized bed gasifier system, comprising: a fluidized bed gasifier, and a cyclone system having two or more cyclones arranged in series, wherein the cyclone system comprises: a first stage cyclone having a first inlet and a first outlet, wherein the first inlet is in fluid communication with the gasifier and receives a first gas-solid mixture from the gasifier; a first dipleg connected to the first stage cyclone for collecting a first solid particle fraction separated from the first gas-solid mixture; a first loopseal connected to the first dipleg for receiving the first solid particle fraction; a second stage cyclone having a second inlet and a second outlet, wherein the second inlet is in fluid communication with the first outlet and receives a second gas-solid mixture from the first stage cyclone; a second dipleg connected to the second stage cyclone for collecting a second solid particle fraction separated from the second gas-solid mixture; a combined dipleg connected to both the first loopseal and the second dipleg; and a combined loopseal connected to the combined dipleg for receiving a mixture of the first and second solid particle fractions, and to the gasifier for feeding the mixture of the first and secon.d solid particle fractions back to the gasifier.

10. The gasifier system of claim 9, wherein the gasifier is a fluidized bed gasifier.

11. The gasifier system of claim 9, wherein the first inlet is a half-volute inlet.

12. The gasifier system of claim 9, wherein the second inlet is a tangential inlet.

13. The gasifier system of claim 9, wherein the first loopseal comprises a first vertical downcomer connected to the first dipleg for receiving the first solid particle fraction, a first downwardly inclined segment downstream of the first vertical downcomer, a first riser downstream of the first downwardly inclined segment, and a second downwardly inclined segment downstream of the first riser.

14. The gasifier system of claim 13, wherein the combined dipleg is connected at a branch point of the combined dipleg to the second dipleg and the second downwardly inclined segment of the first loopseal.

15. The gasifier system of claim 9, wherein the combined loopseal comprises a second vertical downcomer for receiving a mixture of the first and second solid particle fractions, a third downwardly inclined segment downstream of the second vertical downcomer, a second riser downstream of the third downwardly inclined segment, and a fourth downwardly inclined segment downstream of the second riser and connected back to the gasifier.

16. A method for capturing and recycling fines, comprising: generating a first gas-solid mixture in a fluidized-bed gasifier, delivering the first gas-solid mixture from the gasifier to a first inlet of a first stage cyclone; separating the first gas-solid mixture into a second gas-solid mixture and a first solid particle fraction in the first stage cyclone; feeding the second gas-solid mixture from a first outlet of the first stage cyclone to a second inlet of a second stage cyclone and collecting the first solid particle fraction sequentially through a first dipleg connected to the first stage cyclone and a first loopseal connected to the first dipleg; separating from the second gas-solid mixture a second solid particle fraction in the second stage cyclone; collecting the second solid particle fraction through a second dipleg connected to the second stage cyclone; collecting a mixture of the first solid particle fraction from the first loopseal and the second solid particle fraction from the second dipleg sequentially through a combined dipleg connected to both the first loopseal and the second dipleg and a combined loopseal connected to both the combined dipleg and the gasifier; and feeding the mixture of the first and second solid particle fractions from the combined loopseal back to the gasifier.

* * * * *